Oct. 25, 1932.   J. W. MEADOWCROFT   1,884,066
WELDING MACHINE
Filed March 18, 1927   2 Sheets-Sheet 1

INVENTOR.
JOSEPH W. MEADOWCROFT
BY
ATTORNEY.

Oct. 25, 1932.  J. W. MEADOWCROFT  1,884,066
WELDING MACHINE
Filed March 18, 1927    2 Sheets-Sheet 2

INVENTOR.
JOSEPH W. MEADOWCROFT
BY
ATTORNEY.

Patented Oct. 25, 1932

1,884,066

UNITED STATES PATENT OFFICE

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

WELDING MACHINE

Application filed March 18, 1927. Serial No. 176,318.

This invention relates to a welding machine, being more particularly related to a spot welding machine utilizing portable electrodes.

In spot welding together plates or other articles, the chief consideration is often the accessibility of the parts for the welding operation. This is especially true in the manufacture of automobile bodies, where the metal stampings are provided with interfitting flanges or similar parts rendering the introduction of the plates between the electrodes most difficult or impossible. Special forms of electrodes have been found necessary for the performance of different classes of work, and it is clearly obvious that the cost of production increases correspondingly. The character of the stampings to be welded is often such that to bring the work to the electrodes requires an unnecessary length of time and burdensome effort.

Accordingly, the prime object of this invention is to provide a welding machine having portable electrodes which may be brought to the work and adjusted to suit its character.

Other objects reside in the structural relationship of the parts and will become apparent from time to time during the description thereof.

In carrying out the invention a pair of electrodes are connected to flexible leads of such length that they may be moved about over a considerable area. These electrodes are arranged to be swingably movable with relation to each other and means is provided for causing the same to move, the last named means and the axis of the said swinging movement being shiftable longitudinally of the electrodes and their relative positions reversible thereon, thereby enlarging the scope of the character of the work which may be performed by the machine.

The transformer and similar parts of the machine may be arranged so as to be moved from place to place, or they may be relatively permanently located as desired.

In the embodiment shown the transformer is relatively permanently located, but it should be understood that other arrangements are within the contemplation of the invention, and the illustrated form merely one of many.

Figure 1:
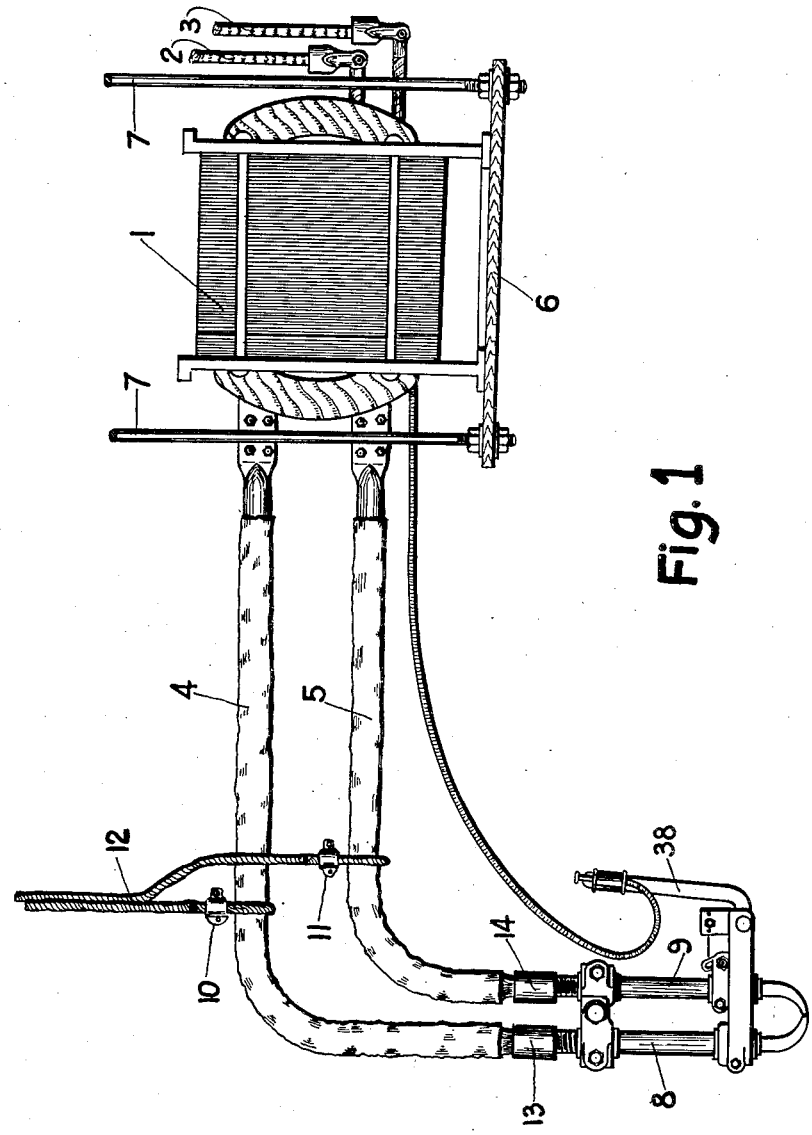
Fig. 1 shows the machine in side elevation.
Figure 3:
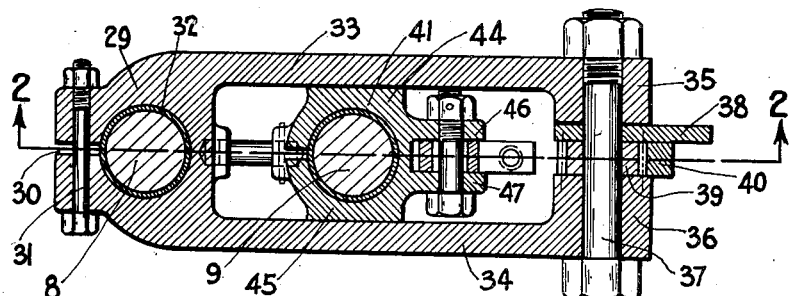
Fig. 3 is a sectional view taken on the line 3—3 of Fig. 2.
Figure 4:
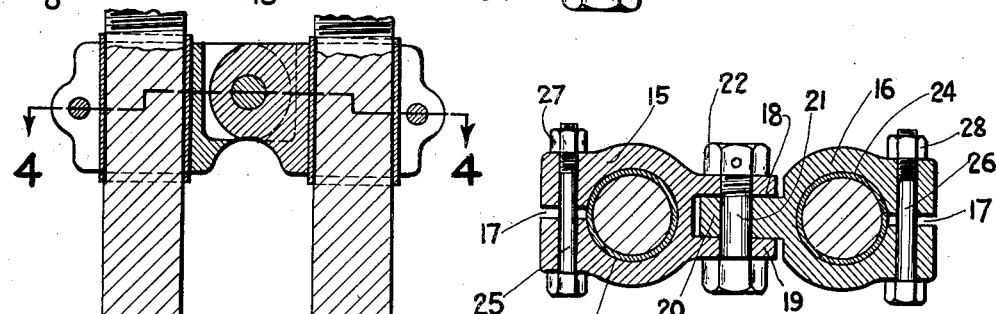
Fig. 4 is a sectional view taken on line 4—4 of Fig. 2.
Figure 2:
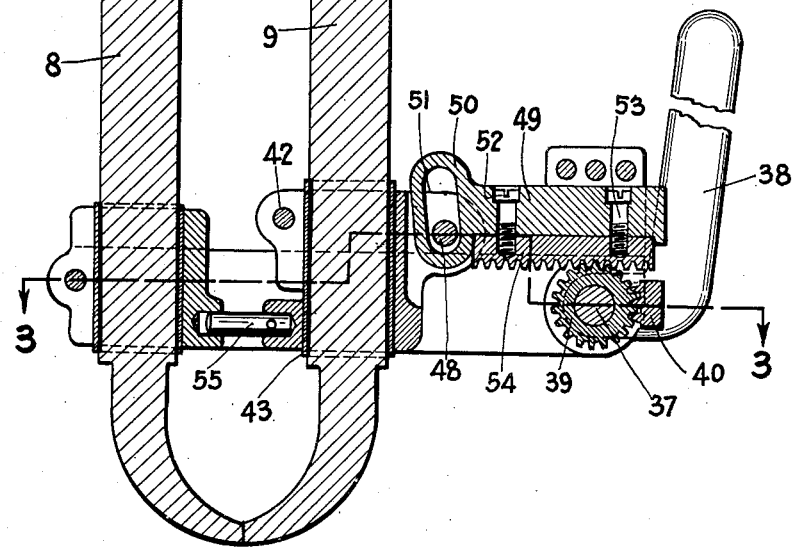
Fig. 2 is a sectional view through the electrodes taken on line 2—2 of Fig. 3.

The machine, as depicted in Fig. 1, has the usual transformer 1, the primary of which is connected with the leads 2 and 3 of an electric circuit, and the secondary of which is connected to the leads 4 and 5. As is well understood in the art, the transformer is for the purpose of obtaining the proper high current capacity and low voltage.

The other elements generally found on welding machines, such as switches, rheostats, etc., are not shown, it being understood that the same may be arranged in the usual manner.

The transformer 1 is shown mounted upon a platform 6 suspended from a suitable support by the rods 7. This manner of mounting and supporting the transformer may be changed to suit varying conditions without departing from the invention.

The leads 4 and 5 extend from the secondary of the transformer to the welding electrodes 8 and 9. These leads are flexible cables, preferably water cooled, of high capacity and of considerable length so that the electrodes may be moved about over a large area. Clamps 10 and 11 may be arranged on the leads and a line 12 connected to said clamps and suitably supported or counterweighted is adapted to hold the leads and electrodes in elevated position. The ends of the leads 4 and 5 are secured in internally threaded connecting thimbles 13 and 14 into which the threaded upper ends of the electrodes 8 and 9 are adapted to be screwed.

The electrodes 8 and 9 may be of any desired or suitable form of portable electrodes, but preferably should be of considerable length. As previously mentioned, the upper ends of the electrodes are threaded, while the lower ends of those shown are reduced and curved inwardly toward each other to form die points. However, the lower ends of the electrodes may be otherwise arranged if desired, as for example, the die points may be straight, angular or otherwise formed and may be integral with, screwed into, or otherwise attached to the electrodes, it being understood that the form shown in the drawings is simply illustrative of one embodiment. For the same reason these electrodes may be water cooled if such an arrangement is found to be desirable.

The electrodes have already been described as swingably movable with relation to each other. This arrangement is brought about through the employment of a two part clamp, the parts of which are pivoted together. This clamp comprises the parts 15 and 16, the former of which is a tubular member slit at 17 along one side so that it may be slid over the electrode and having spaced projecting arms 18 and 19 along the opposite side. The part 16 is similar to the part 15 except, that instead of having the spaced projections along one of its sides it is provided with a single projection 20 adapted to fit between the projections 18 and 19. The three projections are provided with aligned openings through which a pintle bolt 21 passes, this bolt being held in position by a nut 22. Insulating bushings 23 and 24 surround the electrodes at the points where the clamps hold the same. In order to tightly secure them in position upon the electrodes, the clamps are each provided, along the side thereof having the slit 17, with openings for the accommodation of clamping bolts 25 and 26. It is obvious that when these bolts are screwed down through the nuts 27 and 28 the clamp will be drawn into tight engagement with the electrodes. It is also clear that by loosening up the bolts 25 and 26 the clamp may be moved around upon the electrodes.

Upon one of the electrodes, in this instance the electrode 8, an elongated clamp like member is secured. This member comprises a sleeve portion 29 slit at 30 so that it may be slipped over the electrode from one end thereof. A bolt 31 passes through aligned openings in the ears of the sleeve adjacent to the slit 30 and is threaded into a nut, so as to draw said ears together, close said slit, and clamp the sleeve upon the electrode. An insulating bushing 32 is arranged between the sleeve and the electrode for an obvious purpose. Arms 33 and 34, having inturned and enlarged bosses 35 and 36 at their ends, project from the sleeve 29 toward the other electrode. These arms are of considerable length for a purpose which will become clear as the description proceeds. The bosses 35 and 36 are provided with aligned openings adapted to receive a bolt 37 upon which an operating lever or handle 38 is swingably mounted and a pinion 39 is rotatably mounted. Secured to one side of the handle is a block 40 in the form of a rack. The teeth of this rack mesh with those of the pinion, and it is apparent, that when the handle is swung the pinion will be caused to rotate thereby. The handle may be provided with a button switch controlling the primary circuit.

The other electrode, here illustrated as electrode 9, is likewise provided with a sleeve like member 41, slit so as to be capable of being forced over the end of the electrode. A bolt 42 is adapted to draw the sides of said slit together to firmly clamp the sleeve upon an insulating bushing 43 surrounding the electrode. The sleeve 41 is not circular in shape as two of its diametrically opposed sides 44 and 45 are flat and extend outwardly so as to have a sliding engagement with the inner surfaces of the arms 33 and 34. The sleeve has spaced projecting arms 46 and 47 forming a fork upon its side opposite to the slit side. The arms of this fork have openings therein for the reception of a bolt 48. A member 49, having an enlarged portion 50 at one end, is operatively connected to the sleeve 41. This connection is effected by providing the enlarged portion 50 with an elongated slot 51 through which the bolt 48 extends. Detachably connected to the underside of the member 49, by means of countersunk attaching screws 52 and 53, is a rack bar 54. This rack bar is adapted to mesh with the pinion 39. A guide pin 55 is connected to the sleeve 41 and has sliding engagement within a recess formed in the sleeve 29.

The detailed description so far given has clearly indicated the manner in which the machine operates. The electrodes are shown in the drawings as in the closed or welding position, it being simply necessary in order to separate the same to depress the handle 38, rotate the pinion 39, and cause the rack bar 54 to move outwardly. It is obvious that reverse movement of the handle will cause the rack to move in the opposite direction and the electrodes to swing together into pressure contact with the work. The slot 51 takes care of the swinging movement of the electrode 9.

The advantages present in the construction described, beside the simplicity of the machine, reside in the numerous and versatile uses to which the machine may be applied. If the nature of the work is such, that easy access thereto can not be had with the parts arranged as shown, it is only necessary to loosen the clamps of the operating means and reverse the same upon the electrodes. Also the position of the operating lever might be the obstacle in the way of reaching the work, in which case its position may be reversed. Again, it may be that neither of the adjustments set forth will answer the purpose, but that access to the work is allowed by simply moving the operating means to another position upon the electrodes. Still another adjustment inherent from the structure of the machine lies in the reversibility of the relative positions upon the electrodes of the axis of their swinging movement and the actuating means for such movement. This feature results from the fact that both clamps, the pivotal clamp or the actuating clamp, are quickly detached from the electrodes and moved to a new position.

The structure, operation, and advantages of the machine embodying the invention have now been explained at length, but it should be understood that there are other advantages present therein that have not been set forth, and that the number of variations and adaptations which the invention may take is controlled by the scope of the appended claims.

What I claim is:—

1. A spot welding machine comprising portable electrodes, clamp members arranged upon said electrodes and pivotally connected together, whereby said electrodes are swingable with respect to each other, a second set of clamp members arranged upon said electrodes and operatively associated with each other whereby said electrodes may be moved, the relative positions of said sets of clamps upon said electrodes being interchangeable so that said machine may operate upon different forms of work.

2. A spot welding machine comprising portable electrodes movable relatively to each other, a clamp removably arranged upon one of said electrodes, a second clamp removably arranged upon the other of said electrodes, and means upon said clamps for moving the same and the electrodes relatively to each other, said clamps being adapted to be interchangeably arranged upon the electrodes.

3. A spot welding machine comprising portable electrodes movable relatively to each other, a clamp arranged upon one of said electrodes having a pinion and means for actuating said pinion associated therewith, and a clamp arranged upon the other of said electrodes having a rack adapted to mesh with said pinion, whereby said clamps and electrodes, may be moved relatively to each other, said clamps being adapted to be shifted longitudinally of the electrodes or to be interchanged thereon.

4. A spot welding machine comprising portable electrodes movable relatively to each other, a clamp arranged upon one of said electrodes having a pinion and means for actuating said pinion associated therewith, and a clamp arranged upon the other of said electrodes and located between portions of said first named clamp having a rack adapted to mesh with said pinion, whereby said clamps and electrodes may be moved relatively to each other, said clamps being adapted to be shifted longitudinally of the electrodes or to be interchanged thereon.

5. A spot welding machine comprising portable electrodes movable relatively to each other, and means for moving said electrodes, said means having members arranged one within the other, and means for mounting said members on said electrodes in a plurality of positions.

6. A spot welding machine comprising portable electrodes movable relatively to each other, means arranged upon one of said electrodes forming a part of the means for moving the same, and a second means arranged upon the other of said electrodes within a portion of said first named means and forming another part of the electrode moving means, both of said means being adapted to be shifted longitudinally of or to be interchanged upon said electrodes.

7. A spot welding machine comprising portable electrodes, means movable longitudinally of said electrodes for pivoting the same so as to have relative swinging movement, a second means movable longitudinally of the electrodes for actuating the same in their relative swinging movement, both of said means being detachable from said electrodes and their positions interchangeable thereon.

8. A spot welding machine comprising portable electrodes, a detachable clamp member arranged upon one of said electrodes, a second detachable clamp member arranged upon the other of said electrodes, said clamp members having interfitting portions pivotally connected together, detachable means having a pinion and actuating means therefor arranged upon one of said electrodes, and a second detachable means having a rack operatively engaging said pinion arranged upon the other of said electrodes and included within a portion of said first named detachable means.

9. A spot welding machine comprising flexible leads adapted to be connected to the secondary of a transformer, and portable electrodes connected to said leads, said electrodes being elongated and having pivot means and actuating means arranged thereon intermediate their ends, said means being shiftable longitudinally of said electrodes and their relative positions interchangeable thereon.

10. A spot welding machine comprising flexible leads adapted to be connected to the secondary of a transformer, portable electrodes detachably connected to said leads, means arranged upon each of said electrodes and pivotally attached to each other so that said electrodes will be relatively movable, said means being shiftable longitudinally of the electrodes, and a second means arranged upon each of said electrodes having coacting elements for causing said electrodes to move, said last named means being shiftable longitudinally of the electrodes, both of said means being detachably arranged upon the electrodes and their relative positions thereon interchangeable.

11. In a spot welding machine having relatively movable portable electrodes, an actuating means for said electrodes comprising a member arranged upon one of said electrodes, a second member arranged upon another of said electrodes and included within said first named member, and both of said members being provided with coacting parts adapted to move said members and said electrodes relatively to each other.

12. In a spot welding machine having relatively movable portable electrodes, an actuating means for said electrodes comprising a member arranged upon one of said electrodes, a second member arranged upon the other of said electrodes and included within said first named member, one of said members having a pinion and means for moving the same, and the other of said members having a rack bar meshing with said pinion, whereby said members and said electrodes may be moved relatively to each other.

13. A spot welding machine comprising portable electrodes mounted for movement relative to each other, and means for so moving said electrodes, said means being movable along the electrodes and having reversible and adjustable connections with the respective electrodes, whereby it may both be adjusted longitudinally and also have its operating relation reversed with respect to said electrodes.

14. A spot welding machine comprising electrodes, electrode supporting members connecting said electrodes together for relative movement with respect to each other, electrode operating members connected with said electrodes and operatively associated with each other, whereby said electrodes may be moved with respect to the electrode terminals, the positions of said supporting and operating members being interchangeable so that the machine may operate on different forms of work.

15. A spot welding machine comprising electrodes having terminals movable relatively toward each other, coacting electrode operating means borne upon the respective electrode means by interchangeable connections.

16. A spot welding machine comprising electrodes having terminals movable relatively toward each other, means for supporting said electrodes permitting such movement, and coacting electrode terminal operating means for so moving them, connectible with the electrodes in different planes whereby to differently dispose the operating means with respect to the work and supporting means.

In testimony whereof he hereunto affixes his signature.

JOSEPH W. MEADOWCROFT.